May 10, 1927.

R. R. DAVIS

REAMING OR BORING TOOL

Filed Oct. 29, 1923

1,627,887

INVENTOR
Robert R. Davis.
BY
ATTORNEY

Patented May 10, 1927.

1,627,887

UNITED STATES PATENT OFFICE.

ROBERT R. DAVIS, OF ST. LOUIS, MISSOURI, ASSIGNOR, BY MESNE ASSIGNMENTS, TO ST. LOUIS REAMING TOOL CO., OF ST. LOUIS, MISSOURI, A CORPORATION OF MISSOURI.

REAMING OR BORING TOOL.

Application filed October 29, 1923. Serial No. 671,472.

This invention relates generally to metal-working tools and, more particularly, to a certain new and useful improvement in metal-working tools of the type or class commonly known as boring tools or reamers.

My present invention has for its chief object the provision of an efficient tool of the type or class stated which, briefly, comprises a bar or stock and a series or plurality of cutting-blades or cutters so co-operatively constructed and disposed that, by a convenient, facile lengthwise shifting of the cutters longitudinally or lengthwise of the bar or stock, the cutting-edges of the several cutters shall, with rigidity, accuracy, and precision, be located radially of the bar or stock at the desired or selected working position.

My present invention also has for an object the provision in a tool of the type stated of simple, yet positive, means for individually locking the several cutters rigidly to the bar or stock against radial displacement while, at the same time, permitting lengthwise movement of the cutters simultaneously relatively to the bar or stock for adjustably locating their cutting edges radially of the bar or stock.

My present invention has for a further object the provision in a tool of the type stated of compact, readily manipulated means for effecting a simultaneous lengthwise shifting of the several cutters relatively to the bar or stock to effectively dispose their cutting edges radially of the bar or stock for working operations.

And with the above and other objects in view, my present invention resides in the novel features of form, construction, arrangement, and combination of parts hereinafter described and pointed out in the claims.

Figure 1:
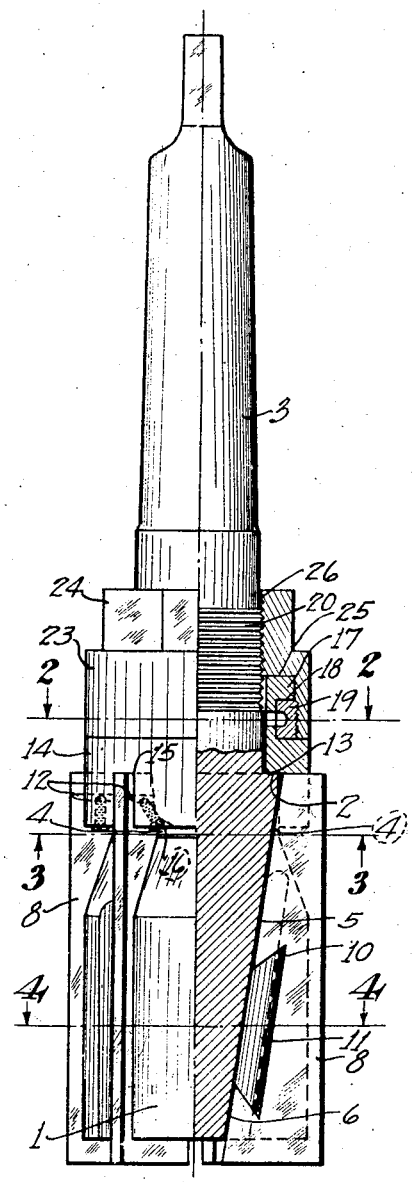
Figure 2:
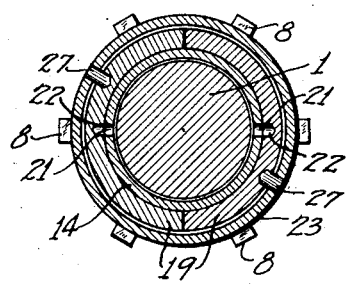
Figure 3:
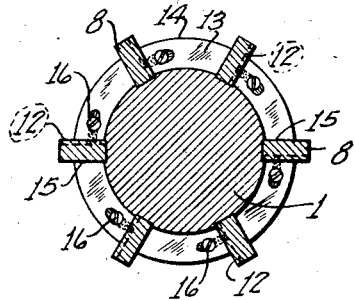
Figure 4:
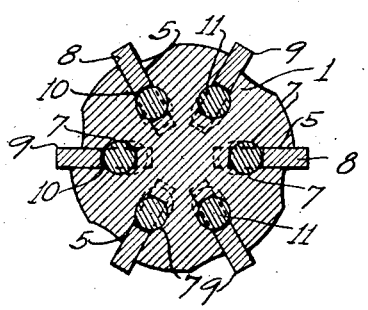

In the accompanying drawing,

Figure 1 is a view partly in elevation and partly in longitudinal section of a boring-tool or reamer embodying my invention; and Figures 2, 3, and 4 are transverse sectional views of the tool on approximately the lines 2—2, 3—3, and 4—4, Figure 1, respectively.

Referring now more in detail and by reference characters to the drawing, which illustrates a preferred embodiment of my invention, 1 designates the main body or stock of the tool, which is preferably a cylindrical steel bar or rod of suitable dimensions diametrically reduced intermediate its ends and thereby annularly shouldered, as at 2, and formed or provided longitudinally with a suitably elongated shank 3 for attachment to the machine for rotarily actuating the tool, as will be well understood. For purposes of description, and with reference to the tool as shown in Figure 1, the upper and lower ends of the tool as there shown will be, respectively, designated the rear and forward ends of the tool, and immediately forward of shoulder 2, the body or bar 1 is diametrically cut-away and thereby provided with a so-called annular seat 4 for purposes shortly appearing.

Suitably formed lengthwise of and radially in, and opening to the peripheral face of, bar 1, is an annular series of cutter-accommodating slots 5, each of which preferably also opens at one end to the forward end of the tool, at which end the slots 5 are of considerable depth relatively to the diameter of the bar 1. At their opposite or rear end, the slots 5 are relatively shallow in depth and open approximately upon the peripheral face of the seat 4, as best seen in Figure 1, the base or lower wall 6 of each slot 5 being smooth, but beveled to incline upwardly and rearwardly from the forward end of bar 1 towards the seat 4, as clearly illustrated in Figure 1; and, for purposes also shortly appearing, the opposite side walls of each slot 5 are longitudinally throughout their length and adjacent the inclined plane bottom or base wall 6 preferably arcuately cut away or recessed, as at 7.

Fitting snugly in the several respective slots 5 for movement both lengthwise and radially of body or bar 1, are suitable cutting blades or cutters 8, each of which is in the form of an approximately oblong rectangular section or block of suitable steel whose outer corner 9 forms the working or cutting edge of the cutter or blade. Each cutter or blade 8, as seen in Figure 1, is, in a manner corresponding to the shape or form of the slots 5, of greater width or depth at its forward end than at its rear end, each blade or cutter 8 for co-operation with the slots 5 being similarly formed or provided with a beveled base or under face that in like degree inclines upwardly from the forward to the rearward end of the blade, and at which beveled face the blade is adapted to rest directly upon, and thereby positively, firmly, and rigidly bear against, the bottom inclined wall 6 of its accommodating slot not only throughout any of its adjustments relatively to bar 1, but also in the actual boring, reaming, or other operations in which the tool in use and practice may be employed. The lengthwise beveled under face of each cutter 8 is, however, interrupted by a suitable pocket or recess 10 formed lengthwise in the blade for accommodating a member 11 preferably in the form of a separate cylindrical steel section, the opposite end walls of the pocket 10 being oppositely beveled, as seen in Figure 1, for interlocking retaining-engagement with the correspondingly beveled ends of the member 11. The member 11 is disposed for the most part in the plane of the blade 8, as seen in Figure 4, but the member 11 is of such dimensions or diameter relatively to the thickness of the blade and to the radius of the slot-wall recesses 7 to project laterally beyond the planes of the opposite side faces of the blade and snugly into the slot recesses or seats 7, as also seen in Figure 4. The member 11 thereby engages the opposite side walls of the accommodating slot 5 for its respective blade or cutter 8 and, while freely permitting lengthwise shifting or adjusting movement in the slot 5 of the blade to selectively locate the cutting edge 9 radially of the bar 1, as hereinafter more fully appears, yet positively and rigidly retains the blade from otherwise outward lateral movement or displacement relatively to the bar 1. Thus, in a most simple, yet most efficient manner, the several blades or cutters 8 are individually locked and retained against radial displacement in the respective slots 5 of the bar 1. Adjacent its rear end and upon one side face, each cutter or blade 8 is provided or formed transversely with a socket or recess 12, as best seen in Figures 1 and 3, for purposes shortly to appear.

Sleeved over the shank 3 and counter-bored to abut, as at 13, against the shoulder 2 and fit partly on the shank 3 and on the bar-seat 4, as seen in Figure 1, is a so-called collar or blade-shifting-member 14, and formed radially through the member 14 at its forward axial end is an annular series of slots 15 opening forwardly of the tool and disposed lengthwise in alignment and registration with the several slots 5 of bar 1; in such slots 15 snugly seat the rear ends of the respective blades or cutters 8, as seen in Figure 1. Passed or projected obliquely through the portions or segments of collar 14 intermediate the slots 15 to seat at their inner ends in the blade-sockets or recesses 12, as illustrated in Figures 1 and 3, are screws or other suitable retaining-members 16 for detachably fastening the several respective blades 8 endwise to the collar 14. Obviously, under the described engagement of the various cutters 5 with the collar 14, the collar 14, while free to move axially, is rigidly locked against rotary movement, upon the bar 1 and its shank 3.

Rearwardly of the closed rear ends of the slots 15, the collar 14 is reduced and counter-reduced in diameter and thereby formed or provided with a ring-retaining flange 17 at its rear axial end and an intermediate annular way or groove 18, best seen in Figure 1, and snugly fitting for rotary movement in the way or groove 18, is an externally threaded split or sectional ring 19 composed preferably of separate complementing segments disposed end to end, as best seen in Figure 3.

Rearwardly of the bar-shoulder 2, the shank 3 is externally threaded, as at 20; and as also best seen in Figure 2, the collar 14 is formed transversely with a pair of orifices 21, 21, through which suitable pins, not shown, are projected to seat in registering recesses 22, 22, in the under face of the segments of ring-member 19 to retain or lock the ring 19 against rotary movement in the way 18 during the threading engagement therewith, in the assembling of the several tool parts, of an axial diametrically enlarged internally threaded preferably integral extension 23 of a blade adjusting-member or nut 24, which is sleeved over shank 3 to abut or impinge at its forward end face 25 against the rear end face of collar 14 and internally threaded, as at 26, for threaded rotary engagement, in turn, with the threads 20 of shank 3. Projected through suitable openings provided for the purpose in the extension 23 of nut 24 to seat in suitable recesses formed in the outer or threaded face of the segments of ring 19, are fixed pins 27 for permanently, after assemblage, securing the ring 19 and the nut or adjusting member 24 together. On the pins mentioned, but not shown, for temporarily, in and to facilitate the assembling of the tool, holding or retaining the ring 19 from rotary movement in the way 18 being now removed, it will be apparent that ring 19 may freely rotarily move or swivel in the groove 18; consequently, being rigidly fixed, as stated, to the nut 24, on subsequent threaded actuation, in use and service, of the nut 24 upon the shank 3 either to the right or left, the ring 19 will be rotarily actuated in like direction in its groove 18, which, in turn, effects axial movement of the collar 14 either forwardly or rearwardly, as the case may be, of the bar 1 and the several cutters 5 caused to lengthwise travel longitudinally of the bar 1 downwardly or upwardly upon the inclined plane bottoms 6 of their accommodating slots 5 and their cutting edges 9 thereby correspondingly located at the desired or selected radial distance from the peripheral face of the bar 1 for effective working operations. In such shifting or adjusting movements or, as it might be said, expanding and contracting movements, of the cutters 8, the screws 16 function naturally, in the locking of the blades 8 to the collar 14, in drawing the several cutters 8 rearwardly and upwardly in the slots 5 on a rearward threading of the adjusting nut 24 upon the shank 3. In the actual working operations of the tool, however, the holding screws 16 are subjected to little or no strain, for, it may be observed, the end-thrust of the cutters in working operations of boring tools is rearwardly of the tool, and hence, in my present tool, any such end-thrust or strain is thrown directly upon the rigid end walls of the slots 15 of the collar 14. I may state here that the engagement between the screws 16 and the cutters or blades 8 is such that, while the screws 16 firmly hold or retain the cutters 8 from longitudinal movement relatively to the collar 14, the several blades or cutters 8 may shift laterally or radially relatively to the collar 14 as they are shifted longitudinally with the collar 14 relatively to the bar 1 and its shank 3. Thus the several cutters 8, mounted and arranged, as described, in connection with the bar 1 and collar 14, while conveniently lengthwise shiftable for effecting a radial adjustment of the cutting edges 9 relatively to the bar 1, are firmly and rigidly held in the working operations of the tool, which results in the accomplishment by the use of my tool of working operations of the greatest exactness, accuracy, and precision.

The several parts of my new tool may be readily manufactured and assembled, and it will be observed that, by mere removal of the screws 16, the several cutters 8 may be shifted endwise outwardly of the slots 5 and 15 for replacement or repair. I may add that the orifices 21, after removal of the mentioned temporary ring holding-pins, form convenient ducts for effecting lubrication of the rotary ring 19 and its attached actuating member or nut 24.

I am aware that changes in the form, construction, arrangement, and combination of the several parts of the tool may be made and substituted for those herein shown and described without departing from the nature and principle of my invention.

Having thus described my invention, what I claim and desire to secure by Letters Patent is:

1. A boring tool or reamer comprising, in combination, a bar having a radial slot opening upon its peripheral face, the bottom wall of said slot being beveled to incline upwardly and rearwardly of the bar, a collar mounted for axial movement forwardly and rearwardly upon the bar and having a radial slot opening to the forward end thereof and disposed in alignment with the slot of the bar, a cutter disposed for movement in the slot of the bar both longitudinally and radially of the bar and having an end disposed in the slot of the collar, said cutter having a correspondingly beveled underface fitting upon the beveled face of said slot, whereby a shifting of the cutter longitudinally of the bar is adapted to effect an adjustment of the cutting edge of the cutter radially of the bar, means for shifting the collar axially forwardly and rearwardly of the bar, and a screw having engagement with the collar and with the cutter for fastening the cutter at its said end to the collar in such manner, whereby, upon axial movement of the collar forwardly or rearwardly of the bar, the cutter is endwise shifted correspondingly forwardly or rearwardly of the bar and at the same time permitted to move radially of the bar.

2. A boring tool or reamer comprising, in combination, a bar having a radial slot opening upon its peripheral face, the bottom wall of said slot being beveled to incline upwardly and rearwardly of the bar, a collar mounted for axial movement forwardly and rearwardly upon the bar and having a radial slot opening to the forward end thereof and disposed in alignment with the slot of the bar, a cutter disposed for movement in the slot of the bar both longitudinally and radially of the bar, the cutter having an end disposed in the slot of the collar and provided upon one side face of its said end with a transverse recess and said cutter also having a correspondingly beveled underface fitting upon the beveled face of said slot, whereby a shifting of the cutter longitudinally of the bar is adapted to effect an adjustment of the cutting edge of the cutter radially of the bar, means for shifting the collar axially forwardly and rearwardly of the bar, and a screw having engagement with bar, and a screw having engagement with the collar and slidably seating at an end in said recess for fastening the cutter at its said end to the collar in such manner, whereby, upon axial movement of the collar forwardly or rearwardly of the bar, the cutter is endwise shifted correspondingly forwardly or rearwardly of the bar and at the same time permitted to move radially of the bar.

3. A boring-tool or reamer comprising a bar having a radial slot opening upon its periphral face, in combination with a cutter disposed for adjustable movement in the slot, the cutter having a pocket, and means including a member disposed in said pocket and having engagement with the bar for retaining the cutter against radial displacement within the slot both during adjustments and working operations thereof.

4. A boring-tool or reamer comprising a bar having a radial slot opening upon its peripheral face, a wall of said slot being lengthwise recessed, in combination with a cutter disposed for adjustable movement in the slot, the cutter having a pocket, and means including a member disposed in said pocket, and movable with the cutter and having engagement with the bar at said recess for retaining the cutter against radial displacement within the slot both during adjustments and working operations thereof.

5. A boring-tool or reamer comprising a bar having a radial slot opening upon its peripheral face, the opposite walls of the slot being arcuately recessed, in combination with a cutter disposed for adjustable movement in the slot, the cutter having a pocket and means including a cylindrical member lengthwise disposed in said pocket, and movable with the cutter and having engagement with the bar at said recesses for retaining the cutter against radial displacement within the slot both during adjustments and working operations thereof.

6. A boring-tool or reamer comprising a bar having a radial slot opening upon its peripheral face, in combination with a cutter disposed in said slot, the cutter having a pocket and means including a member disposed in said pocket and having engagement with the bar for retaining the cutter against radial displacement in the slot.

7. A boring-tool or reamer comprising a bar having a radial slot opening upon its peripheral face, in combination with a cutter disposed in said slot, said cutter having a pocket upon its underface, and means including a member disposed in and having engagement with the end walls of the pocket and also having engagement with both side walls of the slot for retaining the cutter against radial displacement in the slot.

8. A boring-tool or reamer comprising a bar having a radial slot opening upon its peripheral face, the side walls of the slot being oppositely arcuately recessed, in combination with a cutter disposed in said slot, the cutter having a pocket upon its underface, and means including a cylindrical member disposed in and having engagement at its ends with the end walls of the pocket and at its sides with said recesses for retaining the cutter against radial displacement in the slot.

In testimony whereof, I have signed my name to this specification.

ROBERT R. DAVIS.